United States Patent [19]

Hansen

[11] 4,237,644

[45] Dec. 9, 1980

[54] FISH TROLLING DEVICE

[76] Inventor: Walt Hansen, 9814 E. Upriver Dr., Spokane, Wash. 99206

[21] Appl. No.: 73,239

[22] Filed: Sep. 7, 1979

[51] Int. Cl.³ ............................................ A01K 97/00
[52] U.S. Cl. .................................................. 43/43.13
[58] Field of Search .................... 43/43.13, 42.23, 42.5

[56] References Cited

U.S. PATENT DOCUMENTS

| 1,476,138 | 12/1923 | Bingham . | |
|---|---|---|---|
| 1,875,122 | 8/1932 | Olson | 43/43.13 |
| 2,716,832 | 9/1955 | Minnie | 43/43.13 X |
| 2,741,863 | 4/1956 | Magill | 43/43.13 |
| 2,977,709 | 4/1961 | Keiter | 43/43.13 |
| 3,735,522 | 5/1973 | Thomas | 43/43.28 |
| 3,808,727 | 5/1974 | Flanders | 43/43.13 |
| 3,940,871 | 3/1976 | Evans | 43/43.13 |
| 4,161,078 | 7/1979 | Pagani | 43/43.13 |
| 4,161,841 | 7/1979 | Holstein | 43/42.23 |

Primary Examiner—Nicholas P. Godici
Attorney, Agent, or Firm—Wells, St. John & Roberts

[57] ABSTRACT

A fishing device used to guide a submerged hook line during trolling along a zigzag path through the water. The device includes an upright rudder with angular wings extending from opposite rudder sides. Rearward ends of the wings include downwardly angled flaps. The rudder, wings, and flaps cooperate to impart lateral motion relative to the forward direction of trolling. The lateral movement continues until tension along the attached trolling line increases enough to cause the device to partially flip about an axis and move in an opposite lateral direction. Movement continues along the opposite lateral direction until the trolling line tension again builds and causes the device to flip back on the same axis and move laterally back again. The "zigzag" motion continues as the device is pulled through the water.

10 Claims, 6 Drawing Figures

U.S. Patent  Dec. 9, 1980  4,237,644
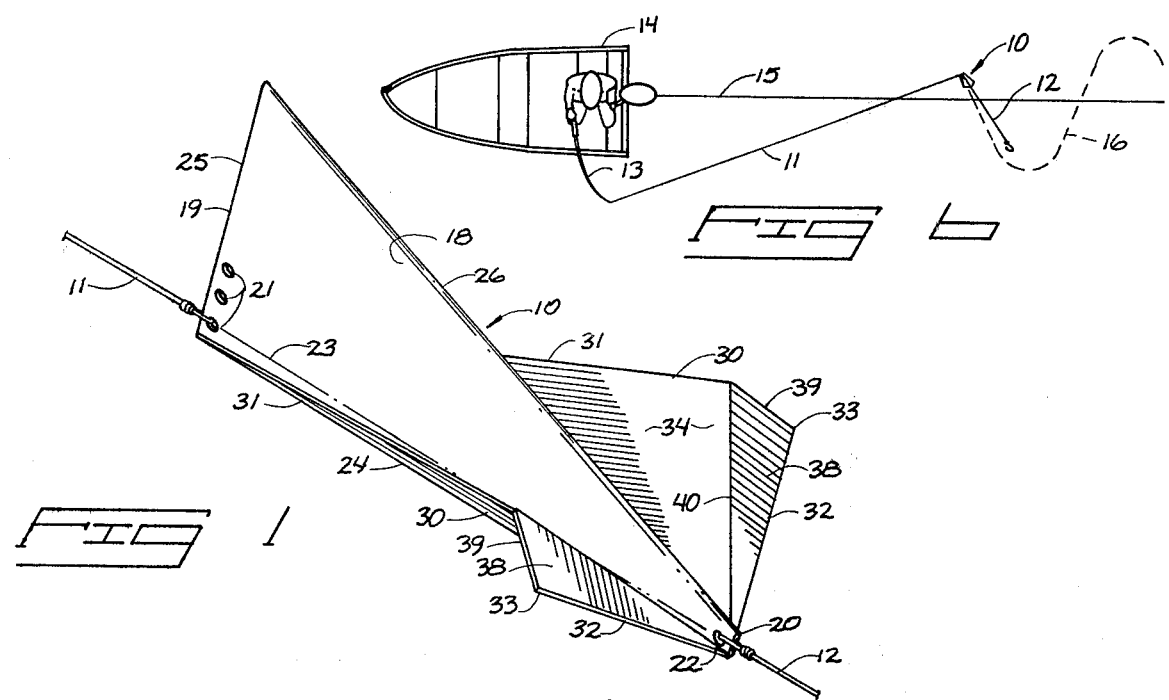
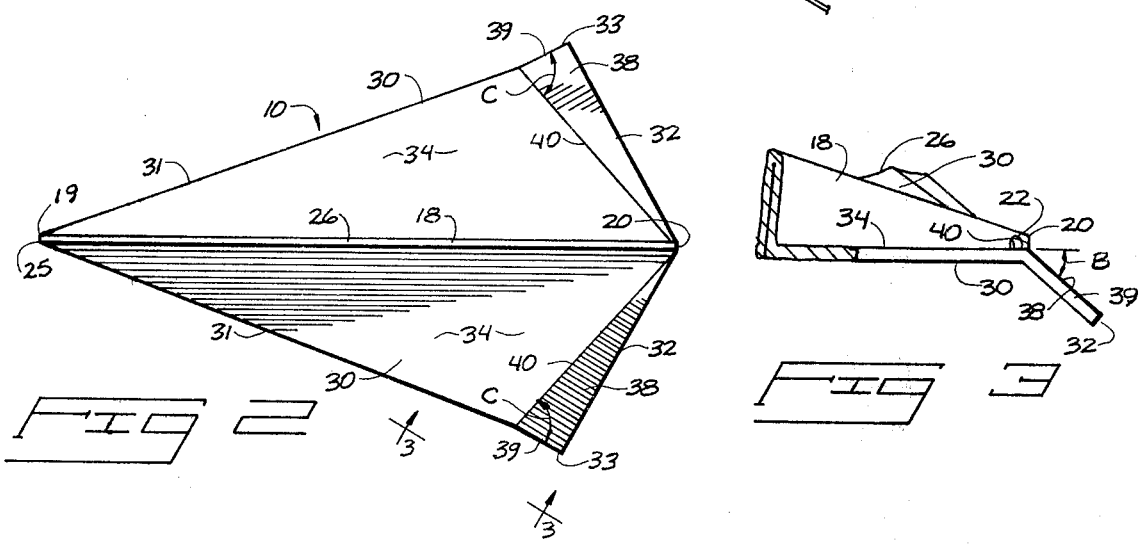
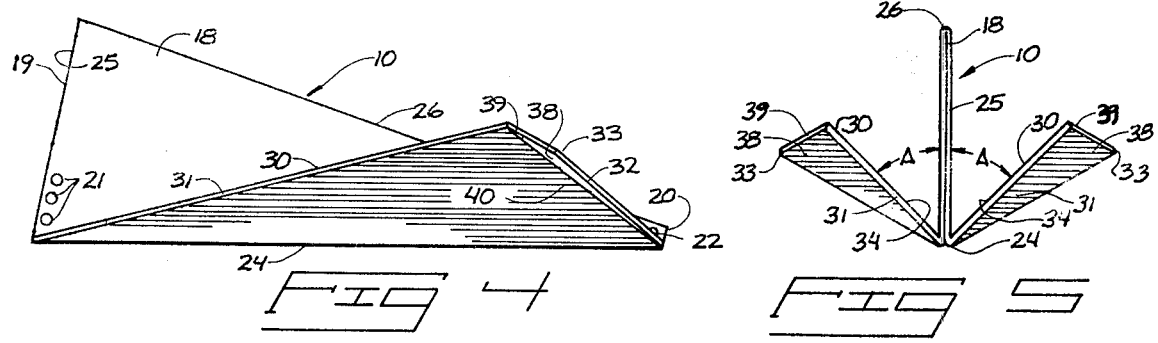

FISH TROLLING DEVICE

BACKGROUND OF THE INVENTION

The present invention is related to trolling devices for controlling movement of a fish lure or bait at the end of a submerged hook line.

Various devices have been known for attachment to trolling lines that control the depth and trailing characteristics of the bait. However, all known forms of such devices trail in a substantially straight line behind the boat, or at best an unpredictable zigzag motion coupled with a spinning motion that can twist the hook line and trolling line.

It is desirable to expose the lure or bait over as large an area as possible and, further, to cause motion of the lure or bait that will attract fish and entice them to bite. It is also desirable to obtain such a trolling device that will produce a uniform, back and forth "zigzag" path for the bait to follow that is predictable and easily detected by the fisherman.

U.S. Pat. No. 1,476,139 to J. R. Bingham discloses a finned lure titled "Fishing Bait". The apparatus includes two intersecting planar pieces of sheet material forming vertical and horizontal intersecting fins. As the "bait" is pulled through the water, it is said that the fins will cause the plate to wobble slightly from side to side, but prevent the plate from rotating. The motion imparted is said to be similar to the darting motion common to small fish. This device is intended for use primarily as a "lure" that is mounted directly to the hook, rather than between a trolling line and hook line for the purpose of guiding the hook line in a zigzag path of predetermined amplitude. In fact, the back and forth darting motion of such a device can vary only slightly from the towing path.

U.S. Pat. No. 2,741,863 to J. J. Magill discloses a trolling planer. This device is adapted to interconnect a trolling line with a bait line for the purpose of maintaining the bait at a desired depth behind the boat. It includes laterally outward projecting "vanes" that function to hold the device on a selected plane as it is being pulled along. Relatively narrow diving fins are provided at rearward edges of the vanes that function to cause downward movement of the planer as it is being towed through the water.

U.S. Pat. No. 3,735,522 to Thomas discloses a fishing lure with outwardly projecting "facets" that are angularly oriented relative to a mounting aperture for the fishing line to impart spinning motion to the lure and a "corkscrew or helix" path through the water as it is being pulled along.

U.S. Pat. No. 3,808,727 to Flanders discloses an adjustable, self-regulating trolling device. This device is a form of "diver" that adjusts itself to maintain a selected depth. It is attached between the trolling line and hook line for the purpose of maintaining a straight path for the bait at a selected elevation below the water surface. A horizontal plate is used to maintain the depth of the device while an upright rudder maintains the position of the bait behind the towing vessel.

Of the above patents, none disclose a device that will produce a predictable, variable pattern "zigzag" movement of the lure or bait, without spinning or twisting the line while doing so.

BRIEF DESCRIPTION OF THE DRAWINGS

FIG. 1 is a pictorial view of the present device;
FIG. 2 is a top plan view;
FIG. 3 is a fragmentary projection taken along the line 3—3 in FIG. 2;
FIG. 4 is a side elevational view of the present device;
FIG. 5 is a front end elevational view; and
FIG. 6 is a diagrammatic view illustrating the operation of the present device behind a boat.

DETAILED DESCRIPTION OF A PREFERRED EMBODIMENT

The present invention is a device as indicated at 10 for "trolling" type fishing for the purposes of attracting fish to a bait or lure. The device 10 is adapted for connection to a trolling line 11 and to a hook or bait line 12. The trolling line 11 extends from the device 10 to the fisherman's rod 13.

Forward motion is imparted to the device 10 by a propelled boat 14. The forward path is generally straight or slightly curved. The path of the boat is indicated by the line 15 in FIG. 6. The consequential "zigzag" path of the device 10 and hook line 12 is indicated by the dashed line 16.

The present device 10 is shown in much detail by FIGS. 1 through 5. In FIG. 1, for example, the device is shown as having an upright triangular shaped rudder 18 connected at opposed ends 19, 20 to the trolling line and hook line respectively. The forward end 19 of the rudder 18 is connected to the trolling line while the rearward end 20 mounts the hook line 12. Vertically spaced apertures 21 are situated at the forward end 19 to provide selective mounting of the trolling line 11 to the device to provide lateral and depth control.

The trolling line is shown in FIG. 1 mounted to the bottom of the three apertures 21. Attachment of the trolling line to progressively higher apertures 21 will cause the device to move in a lateral zig-zag path of progressively under swaths and progressively deeper depths.

A rearward aperture 22 is formed through the rudder at end 20. Aperture 22 mounts the hookline 12. The rearward aperture 22 and any one of the selected forward apertures 21 to which the trolling line is connected, define an axis 23 (FIG. 1) along the length of the rudder. This axis 23 is substantially a straight line between the trolling line and hook line about which the device will "flip" or pivot at the apices or vertices of its "zigzag" movement.

The rudder 18 is of a triangular shape, preferably a scalene triangle with the longest side 24 situated elevationally below the axis 23. The shortest side is shown at 25. Side 25 extends upwardly at the forward rudder end 19 and defines a leading edge as the device is pulled through the water. The remaining intermediate triangular side 26 extends between sides 24 and 25, tapering or converging from the forward end 19 to the rearward end 20 forming the "back" or "ridge" of the rudder 18.

It is preferred that the rudder 18 be formed of a scalene right triangle, with the triangular side 24 being the hypotenuse thereof. This arrangement places the maximum height of the rudder adjacent the forward end 19. It is also preferred to keep the rudder height to rudder length ratio between 1:1 and 1:4.

The present device 10 also includes outwardly extending wings 30 that protrude laterally from the upright rudder 18. The wings function to prevent spinning or rotation of the device and assist in the turning motion accomplished at the turning points along the zig-zag path. Each wing 30 includes a leading edge 31 that diverges rearwardly from the forward rudder 19. Trailing edges 32 diverge forwardly from the rearward rudder end. The trailing edges 32 diverge forwardly from the rearward rudder end. The trailing edges 32 meet the leading edges 31 at laterally spaced tips 33. The tips 33 are situated at the maximum width for the device adjacent the rearward end thereof. Elevationally, the tips 33 are situated above the axis 23.

Each of the wings 30 includes an upwardly facing surface 34. The surfaces 34 are angularly oriented relative to the upright planar surfaces of the rudder 18. The wing angle A between each surface 34 and the upright rudder surfaces is between 25° and 70°. The device will function within that range but it is preferred and the operation is maximized, if angle A is maintained within the range between 50° and 60° from the plane of the rudder 18 (FIG. 5).

Each of the wings 30 includes a triangular flap 38 situated adjacent its trailing edge 32 and rearward end 20 of the rudder. The triangular flaps 38 are coincident and identical to maintain symmetry on both sides of the rudder 18. Each flap 38 includes as its sides, trailing edge 32, a peripheral portion 39 of the leading edge adjacent the tip 33, and a fold line 40. The fold lines 40 extend inward and rearward to the rearward rudder end 20. The flaps 38 are essential in operation of the device.

FIG. 3 shows one of the flaps along a plane that is perpendicular to the fold line 40 to show the true angle between the flap 38 and the upperwardly facing wing surface 34. Angle B, (FIG. 3) is the complement to the true angle between the surface 34 and flap 38. Angle B is preferably less than 90° from the plane of surface 34 and is preferably between 18° and 45°. Moreover, angle C formed between the fold line 40 and leading edge portions 39 is preferably 70° to 75° (FIG. 2).

Prior to operation of the present device, the trolling line 11 is connected to the device through an appropriate selected aperture 21. The hook line 12 is connected to the aperture 22 at the rearward rudder end 20. The bait or lure is then attached at the free end of the hook line and the device is ready for use.

The hook line and device are lowered into the water and the trolling line 11 is let out a desired distance as the boat 14 is moved, preferably in a straight forward path. The amount of trolling line 11 let out from the pole 13 is totally dependent upon the desire of the fisherman and the capacity of his reel.

The "zig-zag" motion starts as the device is pulled forwardly by the trolling line and boat. As lateral zig-zag motion starts, the tension along the trolling line gradually increases to a maximum at the extreme end of one leg of the zig-zag path. During this time the fishing rod will progressively bend against the tension of the trolling line. Finally, tension will overcome the resistance to tipping of the rudder. The device will then flip along the axis 23, causing the device to turn and move laterally in an opposite direction. Tension again increases along the length of the trolling line until it builds to a point where the device is again flipped on the axis 23, causing it to turn back again and move in the first zig-zag direction. The zig-zag path continues so long as forward motion of the boat continues.

The width of the zig-zag path is determined by the trolling speed and by the connection of the trolling line to the apertures 21.

The zig-zag moving hook line and bait cover a wide swath behind the boat and, in addition, simulate the zig-zag paths taken by many forms of bait fish. The lure or bait will therefore appear attractive to game fish whereas the same bait or lure moving along a straight line could be unnoticed.

The above description and attached drawings are given by way of example to set forth a preferred form of the present invention. The attached claims more specifically define the scope of my invention.

What I claim is:

1. A trolling device adapted for connection between a trolling line and a fish hook line for guiding the hookline in a zig-zag path when being pulled through the water in a forward direction, comprising:
    an upright rudder having a forward end and a rearward end;
    a trolling line aperture at the forward rudder end;
    a hook line aperture at the rearward rudder end defining a longitudinal axis with the trolling line aperture;
    said rudder having a height dimension at the forward end greater than the height dimension at the rearward end;
    wings extending outward of the rudder from below the longitudinal axis to opposite sides thereof;
    said wings having leading edges diverging from the forward end at equal acute angles with the upright rudder;
    said wings having upwardly facing planar surfaces; and
    wing flaps formed along the wings adjacent the trailing edges and bent downwardly relative to the upwardly facing surfaces.

2. The trolling device as defined by claim 1 wherein the upwardly facing surfaces form equal acute angles with the upright rudder of between 25° and 70°.

3. The trolling device as defined by claim 1 wherein the upwardly facing surfaces form equal acute angles with the upright rudder of between 50° and 60°.

4. The trolling device as defined in claim 1 wherein the rudder has a selected height and wherein the wings extend outward and upward from below the longitudinal axis and terminate above the longitudinal axis and below the height of the rudder.

5. The trolling device as defined by claim 1 wherein the wing flaps are bent downwardly from the planes of the upwardly facing wing surfaces through equal angles therefrom of less than 90°.

6. The trolling device as defined by claim 1 wherein the ratio of height to length of the upright rudder is in the range of 1:1 to 1:4.

7. The trolling device as defined by claim 1 wherein there are several trolling line apertures spaced apart elevationally at the forward rudder end.

8. The trolling device as defined by claim 1 wherein the flaps are triangular in shape, defined by trailing edges, portions of the leading edges adjacent the intersection of the trailing and leading edges, and fold lines leading along the wings from the leading edge to the rearward end of the rudder.

9. The trolling device as defined by claim 8 wherein the angles formed between the portions of the leading edges and the fold lines are equal angles of between 70° 75°.

10. The trolling device as defined by claim 1 wherein the flaps are bent downward from the planes of the wing surfaces through an angle of between 18° and 45°.

* * * * *